(12) United States Patent
Gabrielson et al.

(10) Patent No.: US 11,872,644 B2
(45) Date of Patent: Jan. 16, 2024

(54) PNEUMATIC TOOL

(71) Applicant: ASC Profiles LLC, Kalama, WA (US)

(72) Inventors: Stephen B. Gabrielson, Longview, WA (US); Sreelatha Nandivada, Sacramento, CA (US); David A. Golden, Orangedale, CA (US)

(73) Assignee: ASC Profiles LLC, Kalama, WA (US)

( * ) Notice: Subject to any disclaimer, the term of this patent is extended or adjusted under 35 U.S.C. 154(b) by 550 days.

(21) Appl. No.: 16/689,922

(22) Filed: Nov. 20, 2019

(65) Prior Publication Data
US 2021/0146458 A1 May 20, 2021

(51) Int. Cl.
*B23D 27/00* (2006.01)
*E04D 15/04* (2006.01)

(52) U.S. Cl.
CPC ............. *B23D 27/00* (2013.01); *E04D 15/04* (2013.01)

(58) Field of Classification Search
CPC .. B21D 39/032; B21D 39/034; B21D 39/035; B23D 27/00; B23D 27/02; B23D 27/04; B23D 27/06; E04D 3/368; E04D 15/04; E04G 21/167; B26D 5/18
USPC .................................................. 83/604, 630
See application file for complete search history.

(56) References Cited

U.S. PATENT DOCUMENTS

| | | | | |
|---|---|---|---|---|
| 1,276,437 A | * | 8/1918 | Stevenson | F04B 47/02 83/630 |
| 1,743,209 A | * | 1/1930 | Groehn | B21J 15/04 173/100 |
| 1,843,935 A | * | 2/1932 | Stevens | B21J 15/18 72/445 |
| 2,874,666 A | * | 2/1959 | Thor | B21D 39/034 29/243.5 |
| 2,996,939 A | * | 8/1961 | Meier | B65B 13/188 140/150 |
| 3,291,163 A | * | 12/1966 | Timmerbeil | B21D 39/035 140/152 |
| 3,656,392 A | * | 4/1972 | Krynytzky | B21D 28/00 83/530 |
| 3,900,937 A | * | 8/1975 | Schleicher | B21D 39/035 29/566.1 |
| 4,531,397 A | | 7/1985 | Pratt | |
| 4,558,584 A | * | 12/1985 | Myers | H01R 43/0421 7/158 |

(Continued)

OTHER PUBLICATIONS

Author unknown; International Search Report and Written Opinion of PCT/US2020/060457; dated Feb. 12, 2021; 9 pgs.

*Primary Examiner* — Sean M Michalski
(74) *Attorney, Agent, or Firm* — Klarquist Sparkman, LLP

(57) ABSTRACT

A pneumatic tool for joining steel decking includes a pneumatic actuator assembly which drives a push rod. The push rod is coupled to a linkage assembly including a rocker link having one end coupled to the frame of the tool, a punch arm having one end coupled to the frame, and a coupler link rotatably coupled to both the rocker link and the punch arm. At the bottom of the tool, a punching mechanism is formed. A trigger mechanism releases a flow of pressurized air into the actuator assembly, thereby driving the push rod out of the housing of the actuator assembly. Movement of the push rod causes the rocker link to rotate about a joint link, thereby driving the coupler link toward the punch arm and causing the punch to rotate about the joint link and mate with the fixed die.

18 Claims, 14 Drawing Sheets

(56) References Cited

U.S. PATENT DOCUMENTS

| | | | | |
|---|---|---|---|---|
| 5,878,617 | A * | 3/1999 | Parker | B21D 39/025 |
| | | | | 72/451 |
| 6,212,932 | B1 | 4/2001 | Parker | |
| 7,021,108 | B2 * | 4/2006 | Bodwell | E04D 15/04 |
| | | | | 29/243.58 |
| 7,523,699 | B2 * | 4/2009 | Sakamoto | B30B 1/42 |
| | | | | 310/12.24 |
| 8,667,656 | B1 * | 3/2014 | Morton | B21D 39/034 |
| | | | | 29/243.58 |
| 10,435,890 | B2 * | 10/2019 | Wiens | B21D 39/035 |
| 2001/0010168 | A1 | 8/2001 | Parker | |
| 2001/0039704 | A1 | 11/2001 | Parker | |
| 2004/0093820 | A1 * | 5/2004 | Sundstrom | E04D 15/02 |
| | | | | 52/528 |
| 2008/0028595 | A1 * | 2/2008 | DeFreese et al. | E04D 3/368 |
| | | | | 29/566.1 |
| 2013/0074434 | A1 * | 3/2013 | Wiens | E04D 15/04 |
| | | | | 29/243.58 |
| 2018/0229316 | A1 | 8/2018 | Brown | |
| 2021/0146458 | A1 * | 5/2021 | Gabrielson | B21D 39/034 |

* cited by examiner

PNEUMATIC TOOL

FIELD

This application relates to pneumatic punching tools.

BACKGROUND

Modern buildings are often constructed using a steel skeleton, concrete floors, and steel roofing. The steel skeleton is typically formed using steel supports, with steel forms placed on the steel supports for the floors. Then, freshly mixed concrete is poured onto the steel forms and allowed to cure. In order to have concrete floors, it is desirable to precisely position the steel forms onto the supports of the steel forms. Further, it is desirable to precisely position the steel forms with respect to each other. The steel forms are typically corrugated sheets of steel, with an upright edge on one side of the sheet of steel, and an envelope on the other side of the sheet of steel to receive the upright edge of an adjacent sheet of steel.

The steel forms are positioned on the supports for the steel forms so that the envelope of the first steel form receives the upright edge of the second steel form, and, likewise, the envelope of the second steel form receives the upright edge of the third steel form. This is repeated until there are sufficient steel forms on the supports of the steel forms to receive the freshly mixed, uncured concrete.

The adjacent steel forms may then be bonded together using a manually operated crimping tool. An operator actuates the crimping tool to form a dent in each side of the envelope of the steel form and also in the upright edge of the next adjacent steel form. The dent precisely positions the steel forms with respect to each other. Also, a welder may tack weld the steel form to the support so as to precisely position the steel forms with respect to the supports. After the steel forms have been positioned on the supports for the steel forms, and also precisely positioned with respect to each other, uncured concrete can be poured onto the top of the steel forms. The weight of the uncured concrete assists in positioning the steel forms onto the supports. In time, the concrete cures and bonds to the steel forms so as to firmly position the steel forms onto the supports.

As described above, an operator may manually crimp the adjacent steel forms to each other. The operator typically walks on the steel forms to carry a crimping or punching tool to each desired punching location, and then uses the punching tool to form a punch to couple the adjacent steel forms together. The operation of the manual punching tool can be a slow process. Further, the operator may tire after operating the manual punching tool for extended periods, which further slows down in process.

The formation of structural steel roof deck can be accomplished using a similar process. Unlike with structural steel flooring, there is no concrete poured onto the upper surface of the roof deck, so there is not the added structural support provided by the concrete to precisely secure the panels together. Therefore, it is even more important that the joints are secured together so as to prevent one panel from lifting off the other. It is also important to prevent the panels from shifting laterally with respect to each other along the seam. In view of the inherent forces created by earthquakes or by wind, there is a weakness associated with punched joints. As a result, supplementary operations are carried out so as to properly join the roof deck sections together. These supplemental operations can include welding and screwing of the seam to satisfy the shear strength requirements of the roof deck. Ultimately, the roof sections must be joined together with sufficient integrity to prevent the panels from separating from each other or shifting laterally as a result of earthquakes or under the presence of high wind conditions.

Unfortunately, there are many problems associated with the prior art approaches. Fundamentally, whenever two pivotable arms are used to form the punch, there is a great potential for misalignment of the arms. Each of the linkages associated with each of the pivotable arms must move in perfect coordination so as to achieve the proper operation. It is known that over time, the various bearings and connections between the linkage members can wear after repeated usage. As the tolerances change between the respective dies associated with the pair of pivotable arms, there is a strong possibility of misalignment between the dies. When a misalignment occurs, the effective crimp between the roof deck sections can become compromised. Furthermore, the use of a pair of pivotable arms can require additional maintenance and repair. Often, the application of power will be more to one side of the leading die arrangement while less on the opposite side of the mating die arrangement. This can also result in an insufficient and inappropriate cut louver or ineffective crimp. Additionally, in some designs, the particular dies associated with forming the louver are extremely complicated. Ultimately, if any of the surfaces associated with the die should become worn or distorted with time, the louver will have an undesired configuration or may ineffectively join the sections of steel decking together. Blade-type male dies for the formation of the cuts into the female die can become dull with time and use.

SUMMARY

In accordance with various embodiments herein, tools for forming features in materials, such as the joints of structural steel roof decks, are described. More particularly, pneumatic shears are described which form a cut in the joints of structural steel decking for the purpose of interlocking the sections of steel decking together.

In accordance with embodiments of the present invention, a pneumatic tool includes a pneumatic actuator assembly which drives a push rod. The push rod is coupled to a linkage assembly comprising a rocker link having one end rotatably coupled to the frame of the pneumatic tool, a punch arm having one end rotatably coupled to the frame, and a coupler link rotatably coupled to both the rocker link and the punch arm. At the bottom of the pneumatic tool, a punching mechanism is formed by a stationary die affixed to the frame and a movable jaw with a punch provided at the end of the punch arm. An operator may use a trigger mechanism to release a flow of pressurized air into the actuator assembly, thereby driving the push rod out of the housing of the actuator assembly. The end of the push rod is coupled to both the rocker link and the coupler link, so linear movement of the push rod out of the housing causes the rocker link to rotate about a joint link with the frame of the pneumatic tool, thereby driving the coupler link toward the punch arm. The punch arm rotates about a joint link with the frame of the pneumatic tool, thereby causing the punch to rotate about the joint link and mate with the fixed die. The punching mechanism may include, e.g., four punch projections, to simultaneously form four v-shaped cuts in the material positioned between the punch and the die.

In accordance with embodiments of the present invention, a pneumatic tool is provided, comprising: a frame comprising a first joint point and a second joint point; a die rigidly coupled to the frame, the die comprising a plurality of female die cavities; a coupler link; a rocker link having a first end portion rotatably coupled to the first joint point of the frame and a second end portion rotatably coupled to the coupler link; a punch arm having a proximal end portion rotatably coupled to the coupler link and a distal end portion rotatably coupled to the second joint point of the frame; a punch coupled to the distal end portion of the punch arm, the punch comprising a plurality of male punch projections, each of the male punch projections being configured to mate with a corresponding one of the plurality of female die cavities; and an actuator assembly, comprising: a housing coupled to the frame; a push rod having a proximal end portion positioned in the housing and a distal end extending out of the housing, wherein the distal end of the push rod is rotatably coupled to the coupler link and rotatably coupled to the second end portion of the rocker link; and a trigger mechanism coupled to the actuator assembly, wherein actuation of the trigger mechanism causes the actuator assembly to drive the push rod from a retracted position to a extended position; wherein the punch arm is rotatable between: (a) a first state when the push rod is in the retracted position in which the punch is spaced from the die, and (b) a second state when the push rod is in the extended position in which the punch engages the die.

In accordance with embodiments of the present invention, a method of crimping metal panels is provided, comprising: supplying pressurized gas (e.g., pressurized air) to an inlet port of a pneumatic tool, the pneumatic tool comprising: a frame; a die rigidly coupled to a distal end of the frame; an actuator assembly comprising a housing and a push rod extending from the housing; a rocker link having a first end portion rotatably coupled to the frame and a second end portion; a punch arm having a proximal end portion and a distal end portion rotatably coupled to the distal end of the frame; and a coupler link rotatably coupled to the second end portion of the rocker link and rotatably coupled to the proximal end portion of the punch arm; positioning a first panel and a second panel between the die and a punch coupled to the distal end portion of the punch arm; and releasing pressurized gas from the inlet port of the pneumatic tool into a pressure chamber of the actuator assembly, thereby causing an internal diaphragm of the actuator assembly to linearly translate a push rod rotatably coupled to the coupler link and rotatably coupled to the second end portion of the rocker link; wherein the linear translation of the push rod applies a force to the coupler link to thereby cause the punch arm to rotate and drive a plurality of male punch projections of the punch through the first panel and the second panel, and into a corresponding one of a plurality of female die cavities in the die.

Still other embodiments of the present invention will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention.

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved apparatuses and methods for punching or crimping material. Punching is a forming process in which a tool, called a punch, is forced through a workpiece and into a die to create a hole via punching and shearing. Prior pneumatic tools are described in U.S. Pat. Nos. 6,990,781 and 7,021,108, the disclosures of which are incorporated herein in their entireties.

Embodiments of the pneumatic tool described herein may be used to form a cut between adjacent sections of, e.g., steel flooring, roofing, and decking. These tools may assure continual and proper alignment between the male punches and female dies associated with the tool. In accordance with some embodiments, a tool is provided for forming a strong connection between adjacent sections of steel roofing, flooring, and decking which forms a secure cut between the sections over repeated usage. In accordance with some embodiments, a tool is provided for forming multiple cuts with a single punching operation at the juncture between adjoining sections of steel flooring, roofing, and decking. In accordance with some embodiments, a pneumatic tool which avoids the use of a pair of pivotable arms is provided. In accordance with some embodiments, a pneumatic tool which is easy to use, easy to operate, and relatively inexpensive is provided.

Figure 1A:
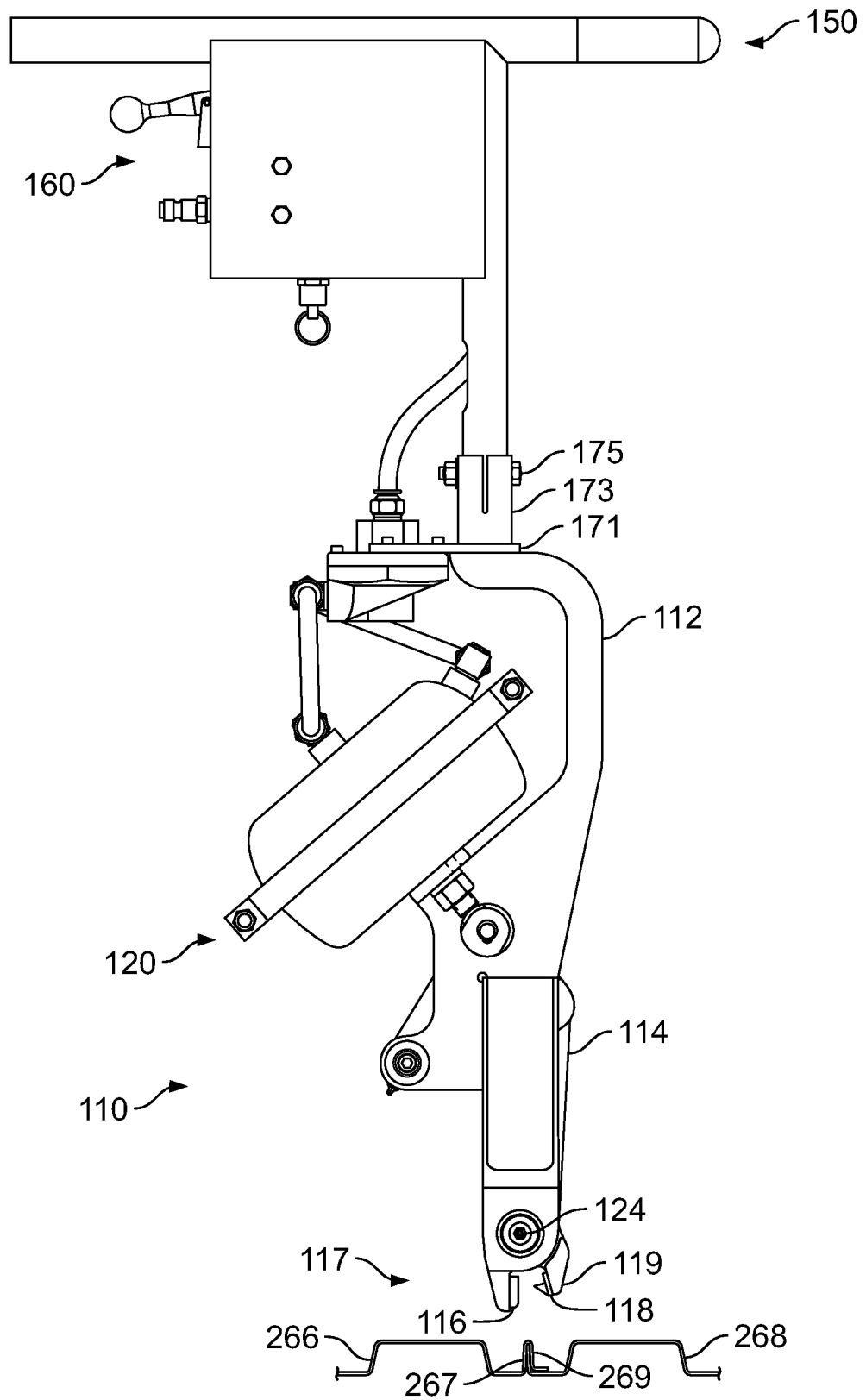
FIG. 1A is a side view of a crimping or pneumatic tool, in accordance with embodiments of the present invention.
Figure 1B:
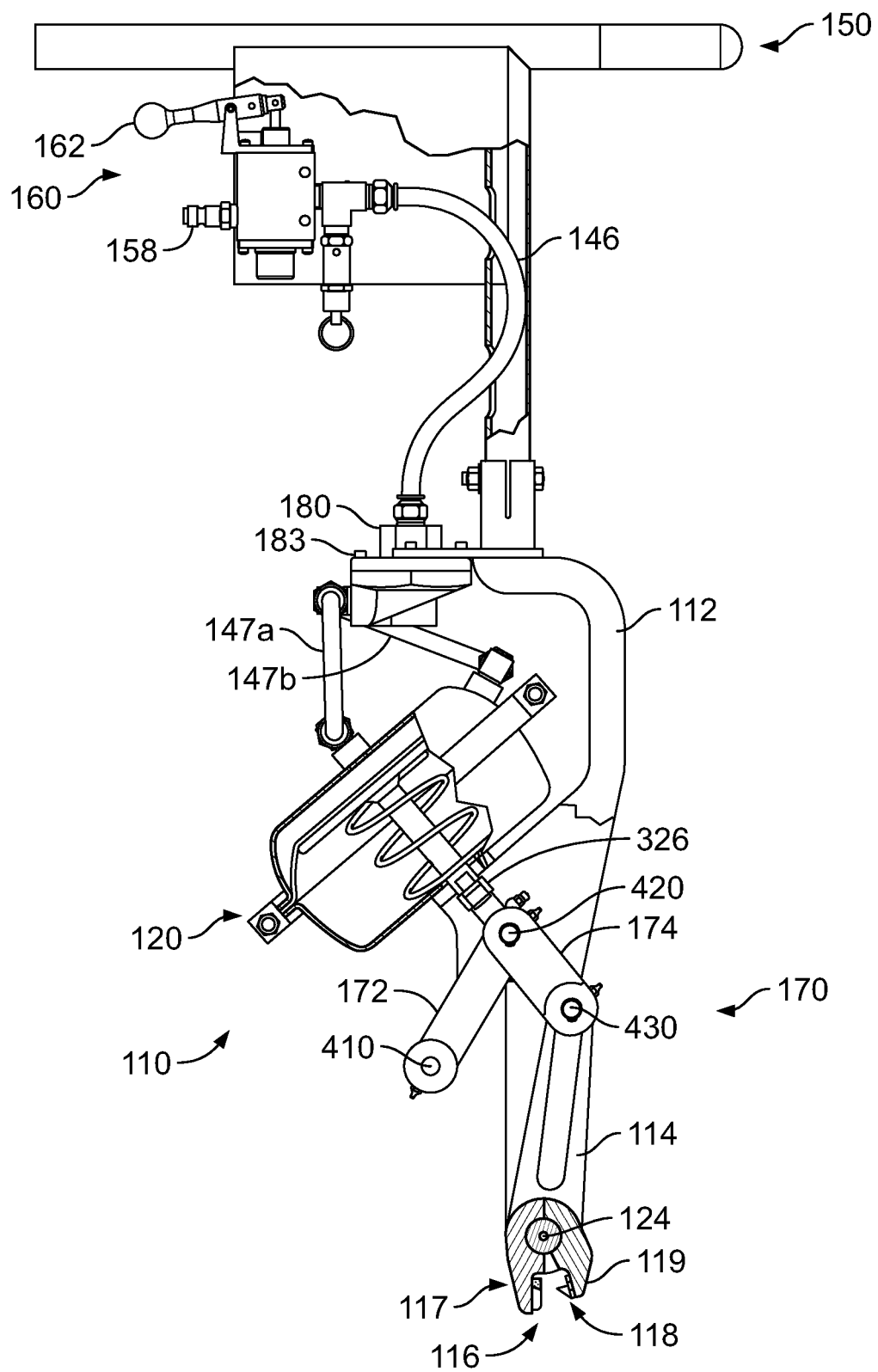
FIG. 1B is a partial sectional side view of the pneumatic tool, in accordance with embodiments of the present invention.

FIG. 1A is a side view of a crimping or pneumatic tool 110, in accordance with embodiments of the present invention. FIG. 1B is a partial sectional side view of the pneumatic tool 110. The pneumatic tool 110 includes a frame 112, a punch arm 114 pivotally mounted on the frame 112, a die 116 fixedly coupled to a lower end of the frame 112, a punch 118 coupled to a jaw 119 at the end of the punch arm 114, and an actuator assembly 120 supported by the frame 112. The frame 112 of the pneumatic tool 110 further comprises a handle portion 150 at an upper end of frame 112, and a trigger mechanism 160 is positioned adjacent to the handle portion 150.

The pneumatic tool 110 further comprises a linkage assembly 170 for transferring the linear force generated by the actuator assembly 120 into a clamping force at the punching mechanism 117. The linkage assembly 170 includes a rocker link 172, a coupler link 174, and the punch arm 114.

Figure 1C:
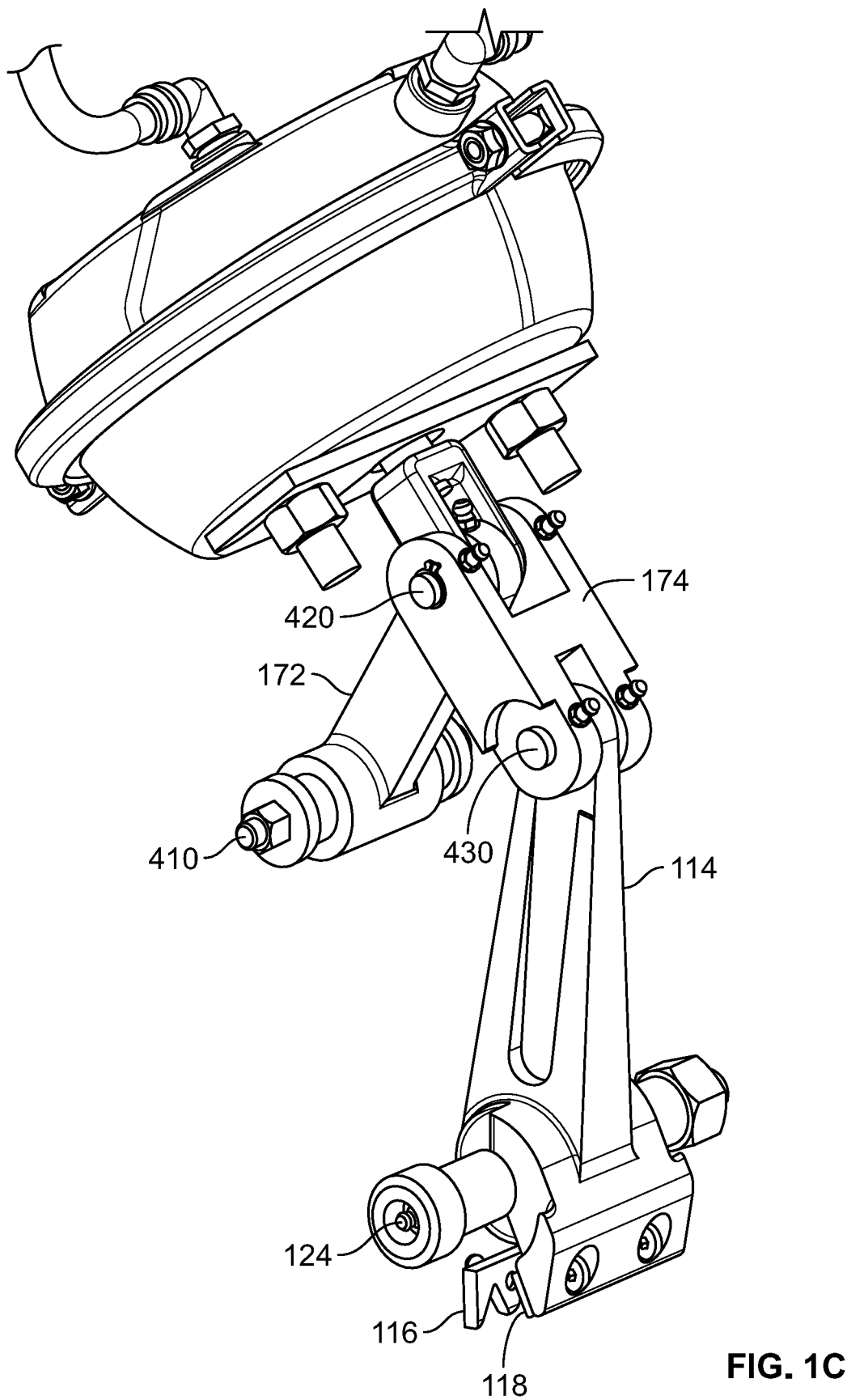
FIG. 1C is a perspective view of a portion of the pneumatic tool, in accordance with embodiments of the present invention.

FIG. 1C is a perspective view of a portion of the pneumatic tool 110 with the frame 112 hidden to more clearly illustrate the arrangement of the linkage assembly 170.

Figure 6:
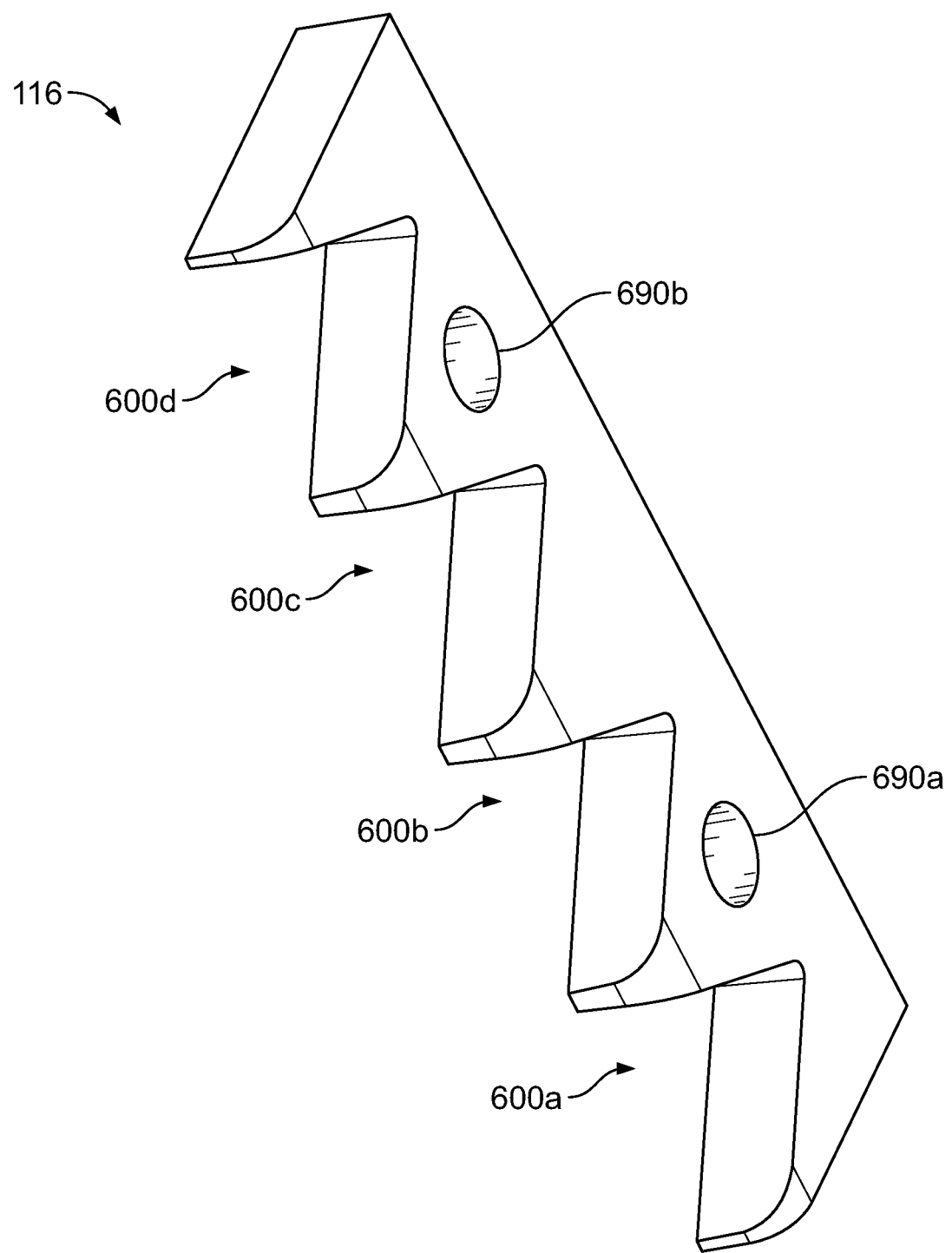
FIG. 6 is a perspective view of a die, in accordance with embodiments of the present invention.
Figure 7:
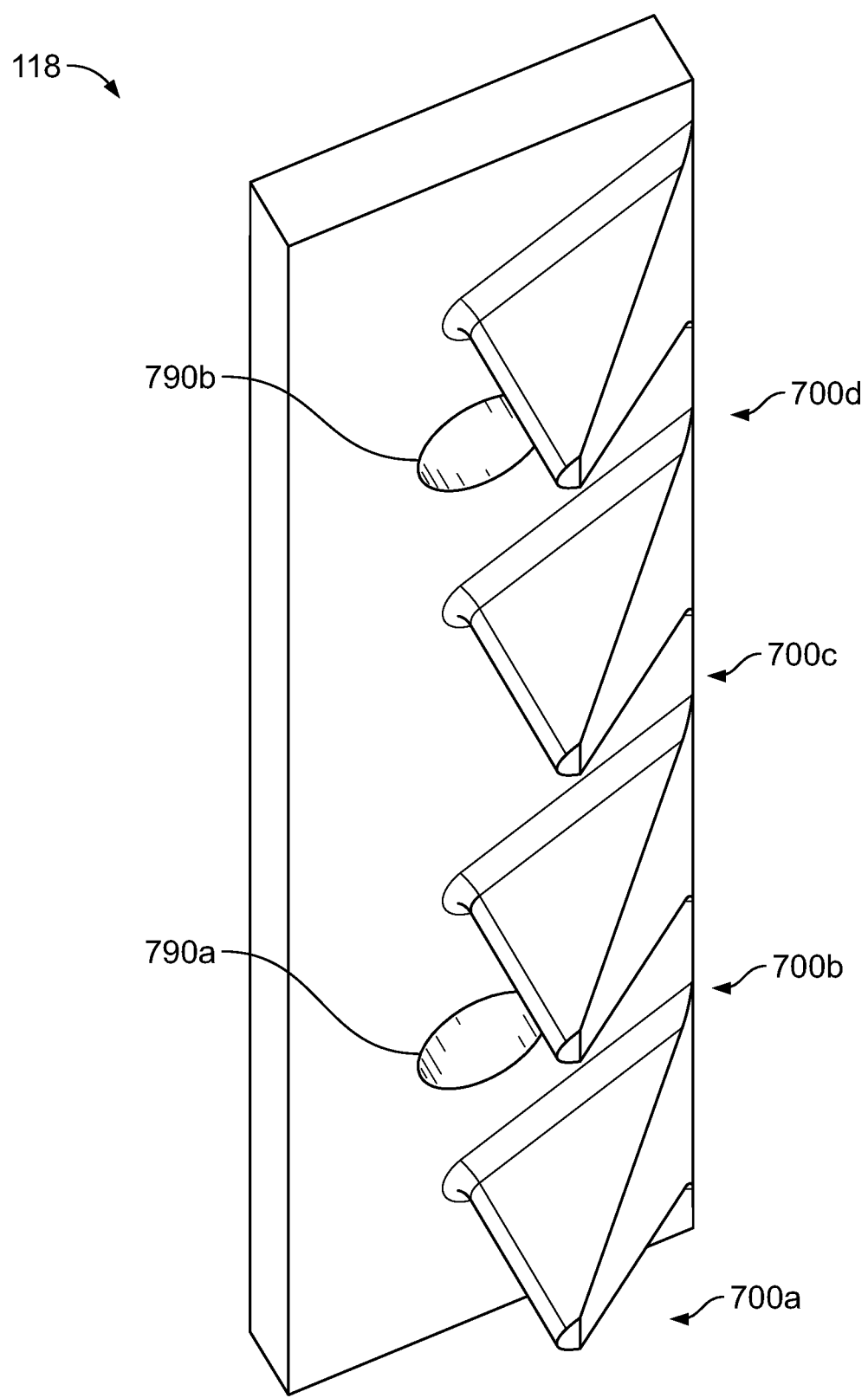
FIG. 7 is a perspective view of a punch, in accordance with embodiments of the present invention.

The punching mechanism 117 at the bottom of the tool 110 comprises a fixed die 116 and a punch 118 coupled to a movable jaw 119. FIG. 6 is a perspective view of the die 116. FIG. 7 is a perspective view of the punch 118. The die 116 comprises a plurality of female die cavities or notches 600a-600d, which are aligned with a plurality of male punch projections 700a-700d of the punch 118 so that the die 116 and punch 118 will suitably mate with each other when the punch arm 114 is pivoted about a fourth joint point 124.

Figure 2:
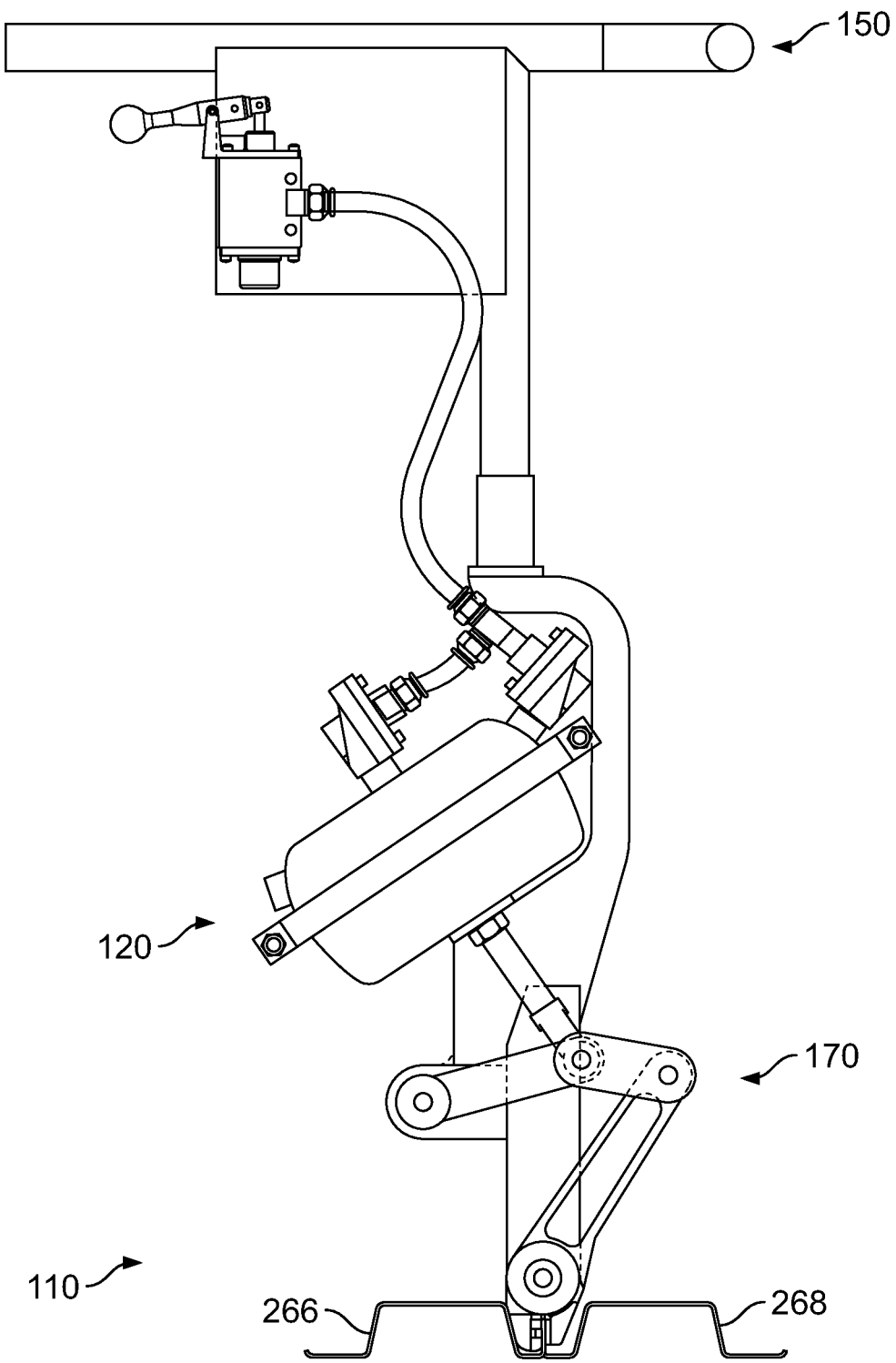
FIG. 2 is a side view of the pneumatic tool in operation to join sections of decking, in accordance with embodiments of the present invention.

In FIGS. 1A-1B, the punch arm 114 is in a first state in which the punching mechanism 117 is open and the punch 118 is spaced from the die 116 such that the materials being punched or crimped may be inserted therebetween. In FIG. 2, the punch arm 114 is shown in a second state in which the punching mechanism 117 is closed and the punch 118 is mated with the die 116, thereby punching the inserted materials and joining the deck sections 266, 268. The deck sections 266, 268 may have an envelope portion and a lip portion coupled together within the space between the punch 118 and the die 116. The actuator assembly 120 and the linkage assembly 170 are used to rotate the punch arm 114 into the second state to close the punching mechanism 117. In the illustrated embodiment, the die 116 comprises a female die and the punch 118 comprises a male punch. When the punch arm 114 is moved to the second state, the male punch projections 700a-700d will pass through the inserted materials to enter the female die notches 600a-600d, respectively. This forms the cuts between the steel deck sections 266, 268 positioned inside the punching mechanism 117.

Figure 3:
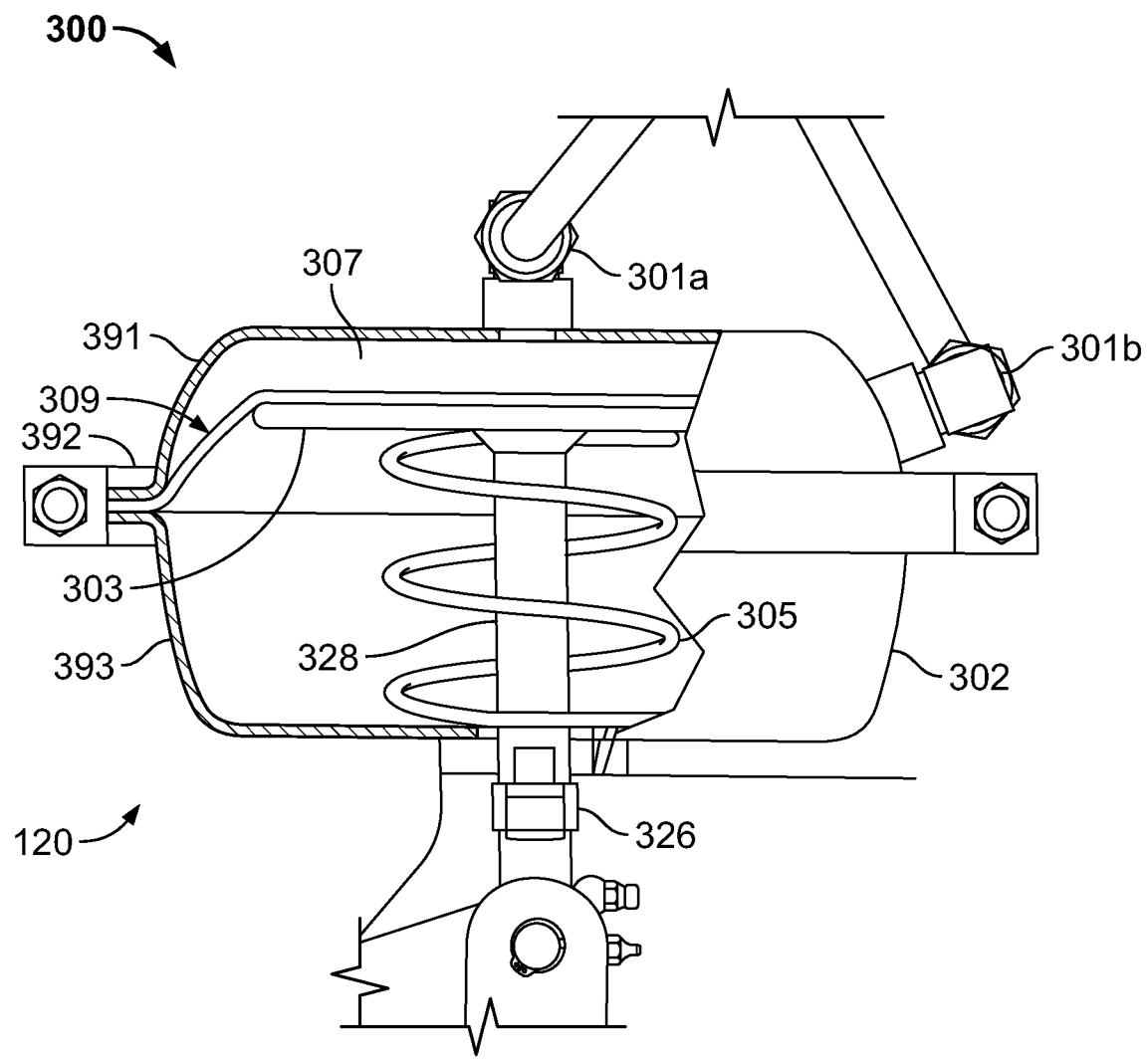
FIG. 3 is a partial side view of an actuator assembly, in accordance with embodiments of the present invention.

FIG. 3 is a partial side view of the actuator assembly 120. In the illustrated embodiment, the actuator assembly 120 comprises an air pressure chamber 300 with a piston-and-cylinder assembly. The actuator assembly 120 comprises a housing 302 containing a flexible diaphragm 309, a push plate 303 coupled to the diaphragm 309, and a push rod 328 coupled to the push plate 303 and extending out of the housing 302 to couple with a clevis 326. The clevis 326 may be threadedly coupled, or otherwise operatively coupled, to the push rod 328 of the actuator assembly 120. The housing 302 comprises an upper canister 391 and a lower canister 393. The diaphragm 309 has its outer edges secured between the upper canister 391 and the lower canister 393, which are coupled together with a clamp ring 392. The diaphragm 309 will bear against the push plate 303 so as to define a space 307 within the interior of the pressure chamber 300. The illustrated embodiment includes two air inlet/outlet ports 301a-301b, which are pneumatically coupled to the space 307 and through which pressurized air may enter the pressure chamber 300 to fill the space 307, thereby pressing the diaphragm 309 toward the lower canister 393.

A return spring 305 extends through the interior of the pressure chamber 300 so as to bear against the push plate 303 and against the inner wall of the lower canister 393. As a result, the return spring 305 will urge the push plate 303 away from the lower canister 393 and into the retracted position shown in FIG. 3. When a sufficient amount of air pressure is applied within the space 307, the pressure will force the diaphragm 309 outwards, thereby pressing the push rod 328 out of the housing 302. When air pressure is not applied within the space 307 of the pressure chamber 300, the return spring 305 will return the push plate 303 toward the inner wall of the upper canister 391, thereby drawing the push rod 328 back into the pressure chamber 300, as shown in FIGS. 1A-1B. The amount of air pressure used depends on various factors, including the size of the pneumatic tool 110 and the gauge of the decking to be punched. In some embodiments, the tool 110 is used to punch decking ranging, e.g., from 22 gauge to 16 gauge, with an air pressure operating range of, e.g., 90 psi to 125 psi.

The pneumatic tool 110 further includes an air inlet port 158 pneumatically coupled to the air supply line 146 and operatively coupled to the trigger mechanism 160. The air inlet port 158 can be detachably coupled to an external source of air pressure (not shown). An operator of the pneumatic tool 110 can pull on a lever 162 of the trigger mechanism 160 to control the flow of pressurized air from the source of air pressure through the air inlet port 158 and to the air supply line 146. In some embodiments, the air supply line 146 may be directly coupled to a single air inlet of the actuator assembly 120 to supply pressurized air into the space 307 of the pressure chamber 300. In the illustrated embodiment, the actuator assembly 120 includes two air inlet/outlet ports 301a-301b and two supply lines 147a-147b, respectively. The two supply lines 147a-147b are pneumatically coupled to the air supply line 146 via a split valve assembly 180. The actuator assembly 120 optionally includes an exhaust valve 183, which allows air to be exhausted from the space 307 after the pressurized air from the external source of air pressure and the return spring 305 pushes the push plate 303 away to compress the volume of the space 307.

Figure 4A:
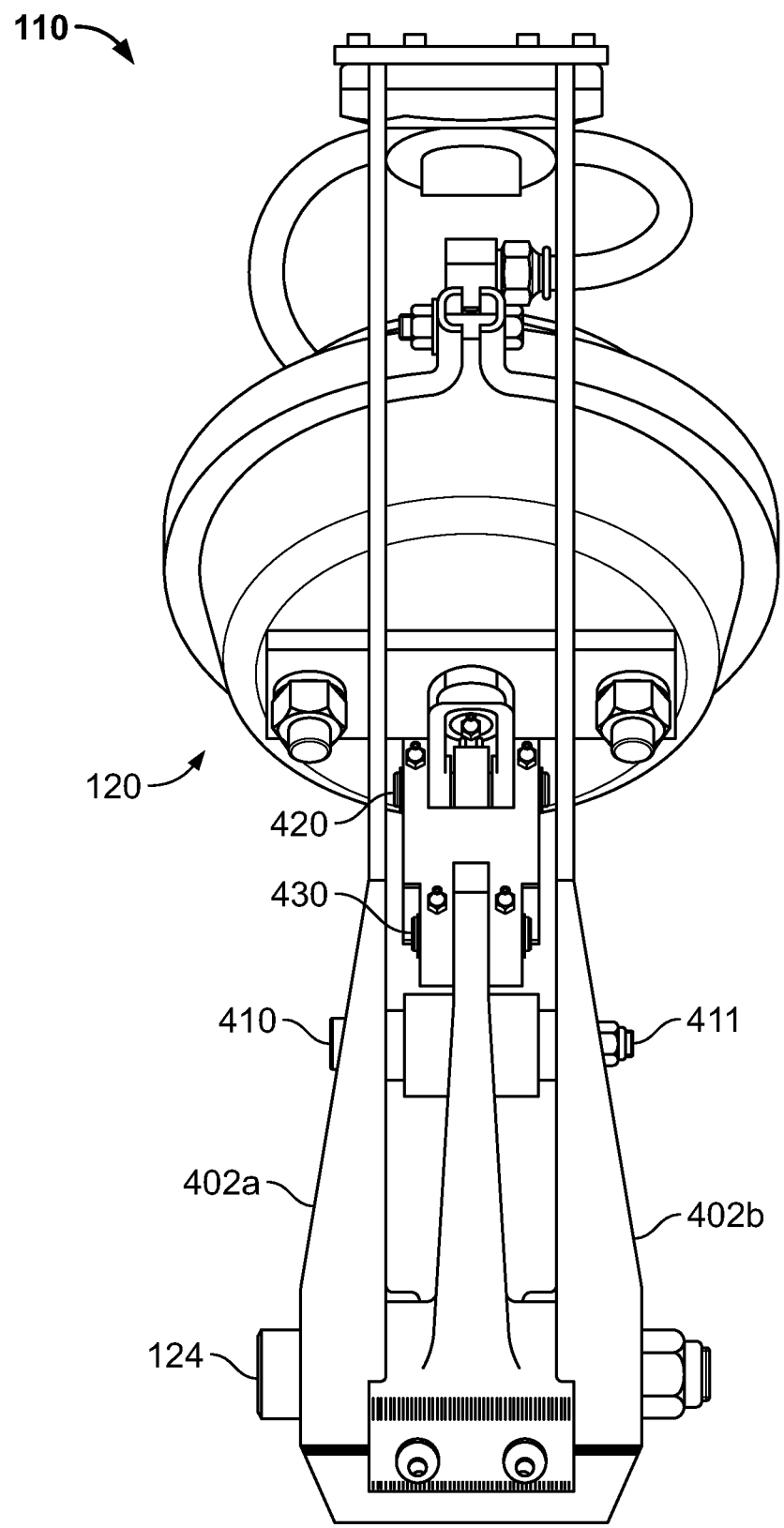
FIGS. 4A-4B are rear and front perspective views of portions of the pneumatic tool, in accordance with embodiments of the present invention.
Figure 4B:
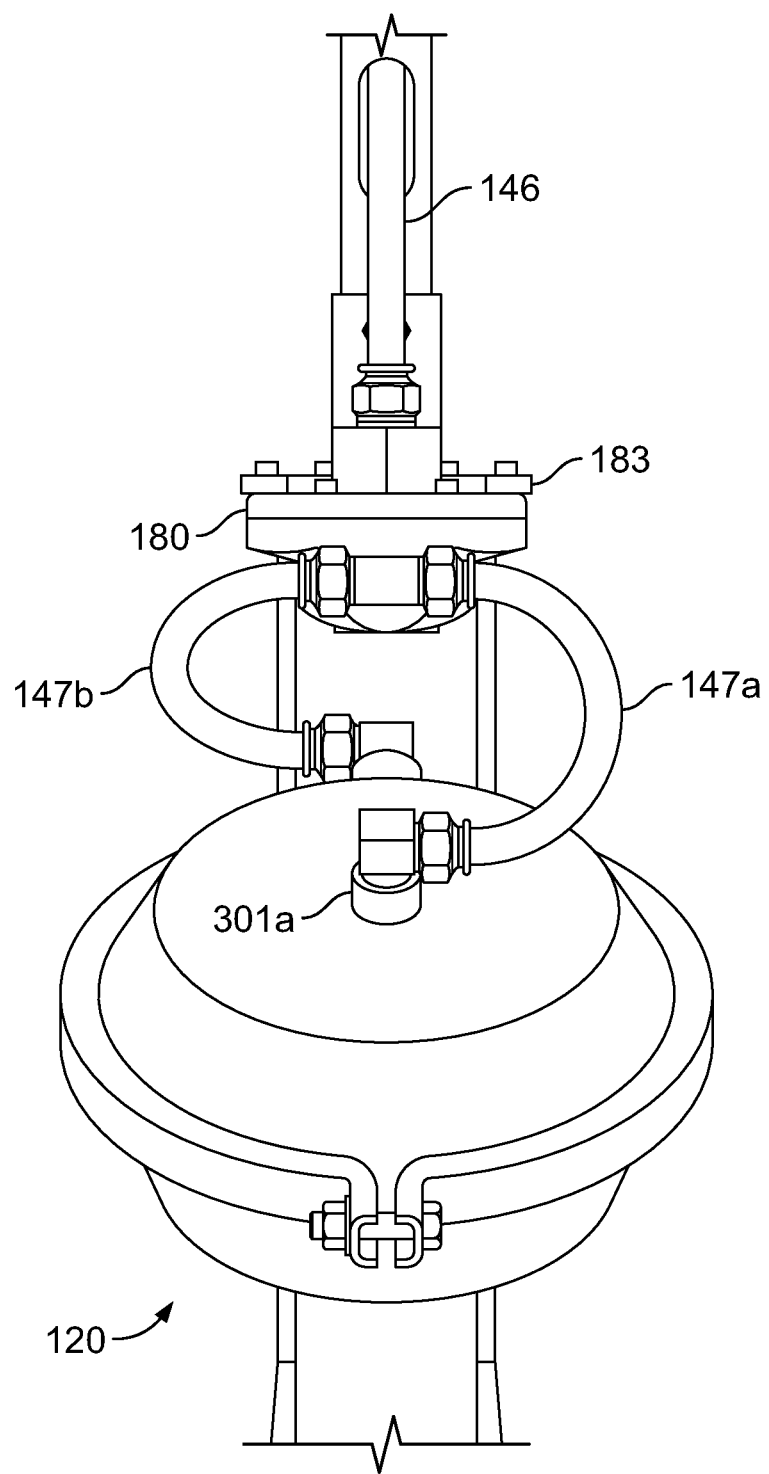

As described above, the linkage assembly 170 transfers the linear force generated by the actuator assembly 120 into a clamping force of the punching mechanism 117. A first end of the rocker link 172 is coupled to a fixed point on the frame 112 at first joint point 410. The first joint point 410 may be provided using a bolt and nut assembly 411 passing through openings on two sidewall portions 402a-402b of the frame 112 and through an opening at the first end of the rocker link 172, as can be seen in FIG. 4A. A second end of the rocker link 172 is rotatably coupled to a first end of the coupler link 174 at a second joint point 420. The clevis 326 is also rotatably coupled to the second end of the rocker link 172 and the first end of the coupler link 174 at the second joint point 420. The clevis 326 operatively couples the actuator assembly 120 to the linkage assembly 170.

A second end of the coupler link 174 is rotatably coupled to a proximal end of the punch arm 114 at third joint point 430. This rotatable coupling may be achieved using, e.g., a pin extending through openings in the coupler link 174 and the punch arm 114, or by any other suitable configuration. A distal end of the punch arm 114 is rotatably coupled to the frame 112 at a fourth joint point 124. A punch 118 is also provided on the jaw 119 at a distal end of the punch arm 114.

Figure 5A:
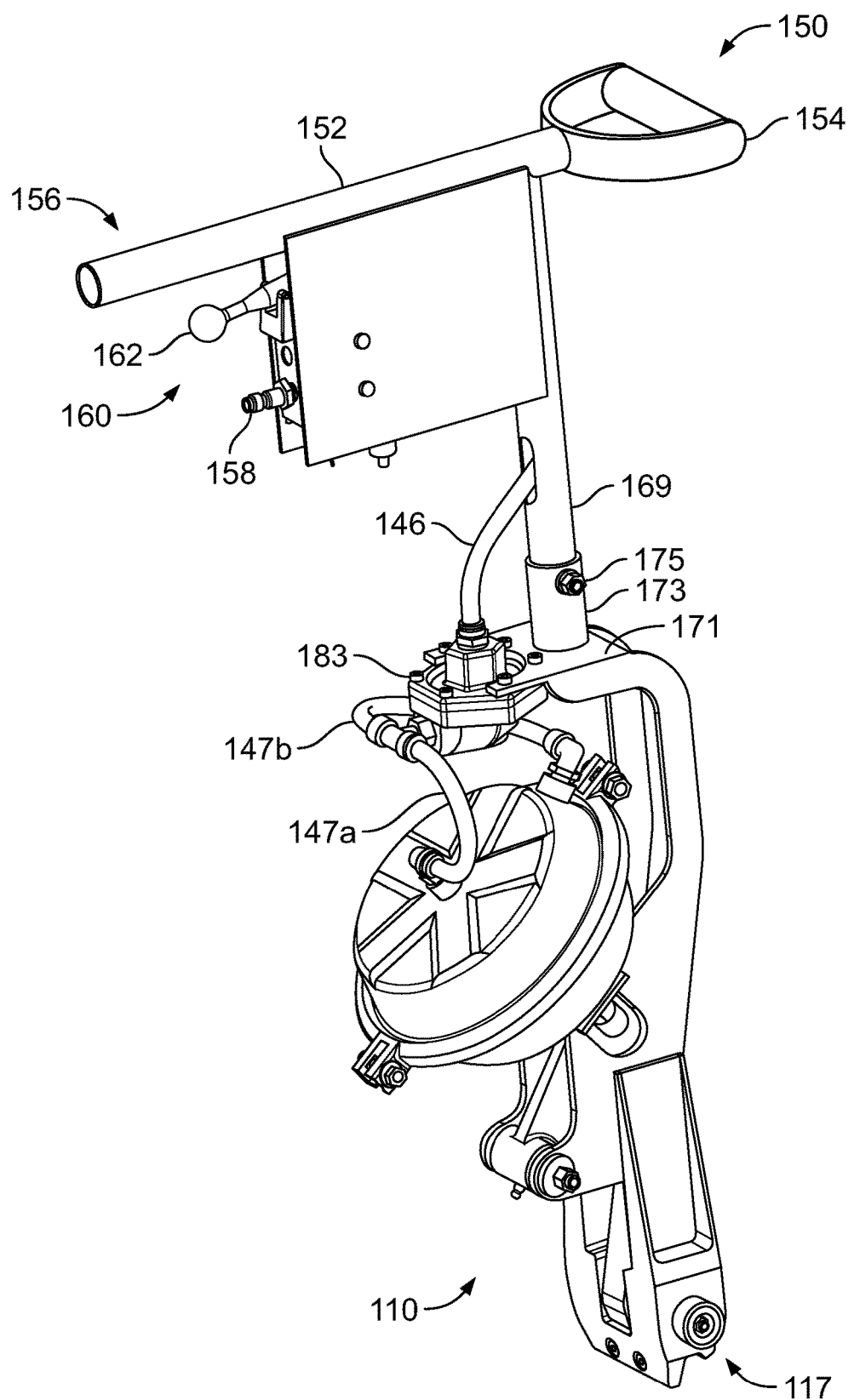
FIG. 5A is a front perspective view of the pneumatic tool, in accordance with embodiments of the present invention.
Figure 5B:
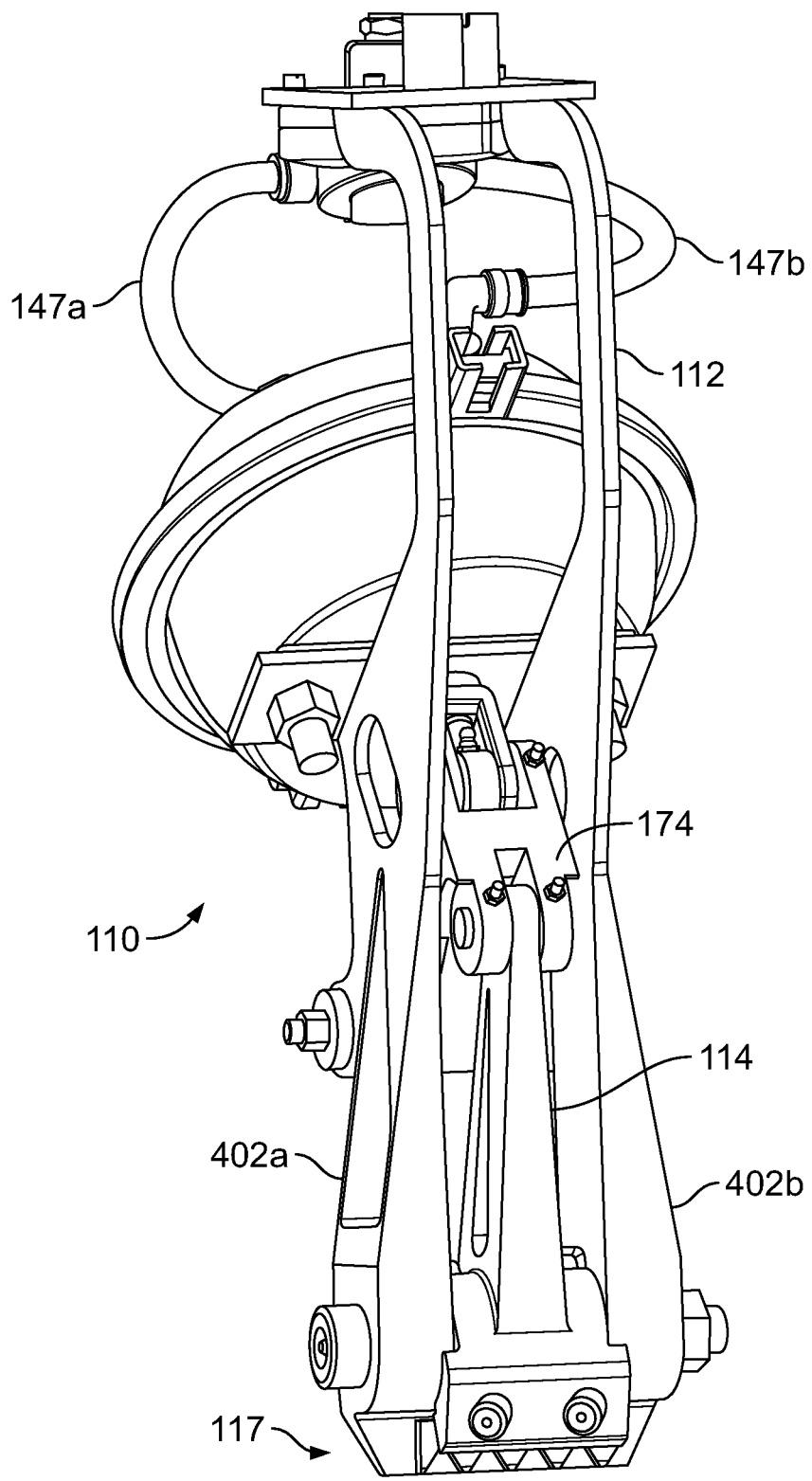
FIG. 5B is a rear perspective view of the pneumatic tool, in accordance with embodiments of the present invention.
Figure 5C:
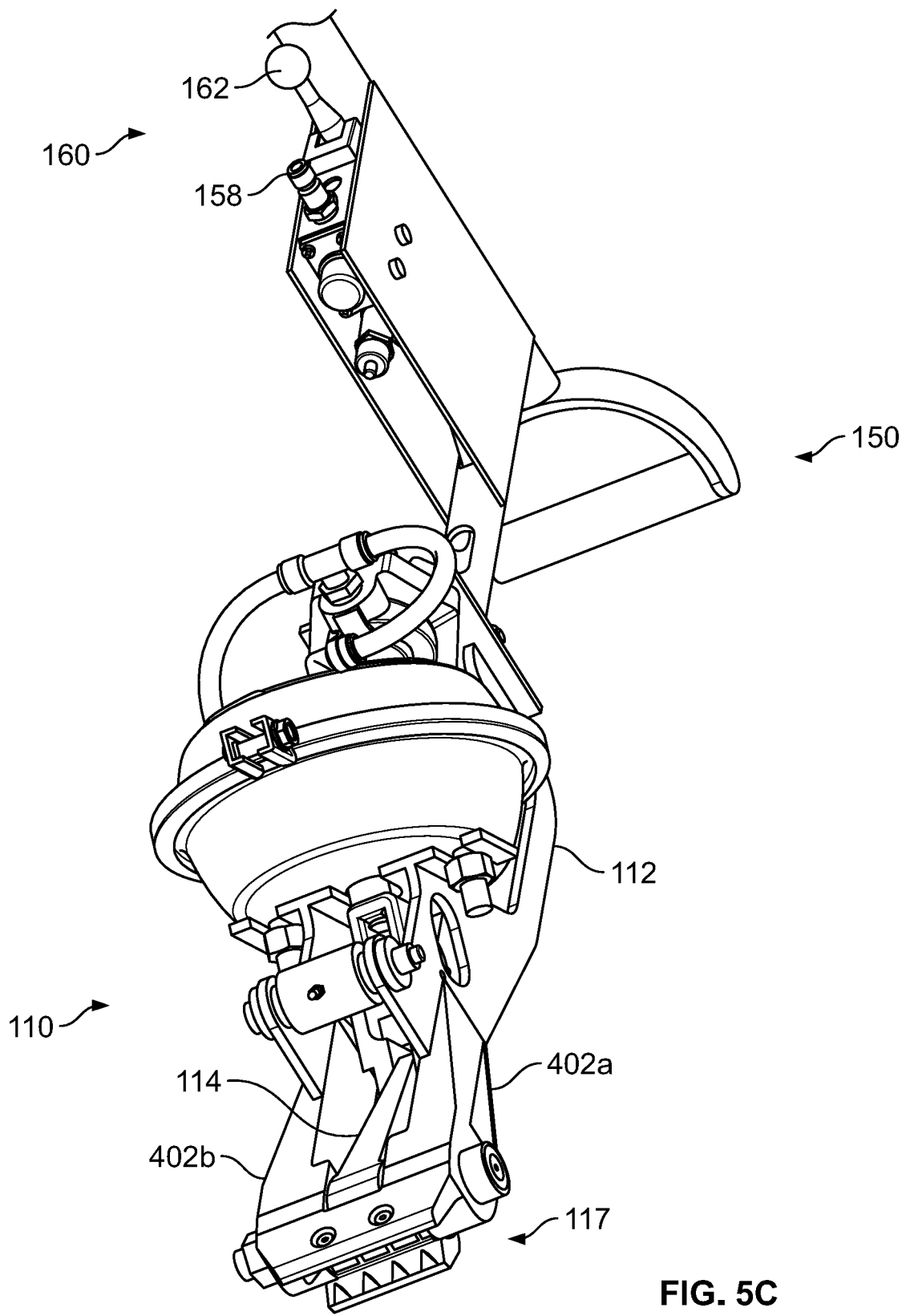
FIG. 5C is another front perspective view of the pneumatic tool, in accordance with embodiments of the present invention.

As can be seen in FIG. 5A, a handle portion 150 is provided at the top end of the frame 112. In this embodiment, the handle portion 150 comprises a downward extending vertical pipe member 169 and a horizontal pipe member 152 coupled to the top of the vertical pipe member 169. A handle portion 154 is provided at one end of the horizontal pipe member 152, and a gripping portion 156 is provided at the opposite end. The bottom end of the vertical pipe member 169 is received within a sleeve 173 and held in position with a bolt or pin 175 extending through the wall of the sleeve 173 and the vertical pipe member 169. The sleeve 173 may be coupled to a support plate 171, e.g., by welding. The parallel and spaced apart sidewall portions 402a-402b extend downwardly from the support plate 171 to the die 116. The handle portion 154 and/or the gripping portion 156 may be coated, knurled, or otherwise adapted so as to allow operators to securely grasp the handle portion 150.

In use, the operator may grasp the handle portion 154 with one hand and the gripping portion 156 with the other so as to position the pneumatic tool 110 in the desired location and to hold the pneumatic tool 110 when performing punching operations.

The lever 162 of the trigger mechanism 160 is positioned adjacent to the gripping portion 156 so as to allow the operator to access the trigger mechanism 160 to control the delivery of air pressure into the actuator assembly 120. The operator can lift the lever 162 to open an air valve within the trigger mechanism 160 to allow air to pass through the inlet port 158, through the air supply line 146 and the supply lines 147a-147b, into the pressure chamber 300. When the lever 162 is released, a spring action of the air valve will close the air valve and return the lever 162 to its default position.

In typical operation, when the trigger mechanism 160 is actuated, air will flow through inlet port 158 through the air supply line 146 and the supply lines 147a-147b so as to create a pushing force on the push rod within the pressure chamber 300. This, in turn, will move the push rod 328, and the associated clevis 326, outwardly. The force applied by the clevis 326 at the second joint point 420 will cause the rocker link 172 to rotate about the first joint point 410 and cause the coupler link 174 to apply a force to the punch arm 114 at the third joint point 430. This force will cause the punch arm 114 to rotate about the fourth joint point 124 and move angularly outwardly from the frame 112. This rotation will, in turn, bring the punch 118 toward the fixed die 116. At the end of the punch arm 114's rotation, the male punch projections 700a-700d will be inserted into the corresponding die notches 600a-600d to mate the punch 118 with the die 116. This will punch any material (e.g., adjoining deck sections) positioned in the space between the punch 118 and the die 116.

When the lever 162 of the trigger mechanism 160 is released, the spring 305 within the pressure chamber 300 will urge the push plate 303 upwardly within the pressure chamber 300. This will cause the push rod 328, and the associated clevis 326, to move inwardly. The retraction of the clevis 326, will apply a pulling force at the second joint point 420 to cause the rocker link 172 to rotate in the opposite direction about the first joint point 410 and cause the coupler link 174 to apply a pulling force on the punch arm 114 at the third joint point 430. This pulling force will cause the punch arm 114 to rotate about the fourth joint point 124 in the opposite direction, thereby drawing the punch 118 away from the die 116.

In accordance with various embodiments, the actuator assembly 120 can be implemented in a wide variety of configurations to apply the desired force on the push rod 328. For example, the pressure chamber 300 can be positioned in other locations on the frame 112 and at other angles with respect to the frame 112 to achieve the desired punching results. In addition, a variety of other linkage configurations may be used to allow for the desired movement of the punch 118. For example, in some embodiments, the actuator assembly 120 may be configured such that the internal pressure caused by the external air supply could retract the push rod 328, rather than cause the extension of the push rod 328 as described above. As a result, through suitable linkages and arrangement of the punch and die, the retraction of the push rod 328 would cause the punch and die to clamp together. In accordance with other embodiments, the actuator assembly need not be pneumatically driven, and instead the actuator could be hydraulic, electric, or any other suitable mechanism.

FIG. 2 is an illustration of the pneumatic tool 110 as used for the joining of deck sections 266 and 268. The deck section 266 may be configured with an envelope portion 267, in which a lip portion 269 of the deck section 268 is received. The pneumatic tool 110 is positioned such that both the envelope portion 267 and the lip portion 269 are positioned inside the punching mechanism 117 between the punch 118 and the fixed die 116. As shown in FIG. 2, the punch arm 114 is positioned in its second state in which the push rod 328 is in the extended position and the punch 118 engages the die 116. When the trigger mechanism 160 is actuated, the actuator assembly 120, and, in particular, the pressure chamber 300 is actuated so as to urge the push rod 328 outwardly therefrom. As a result, the punch arm 114 will pivot about the fourth joint point 124 so as to be at a greater angle relative to the longitudinal axis of the frame 112. As a result, the punch 118 will be pressed against the fixed die 116 so as to carry out the desired crimping operation for the joining of deck sections 266 and 268 together.

Figure 8:
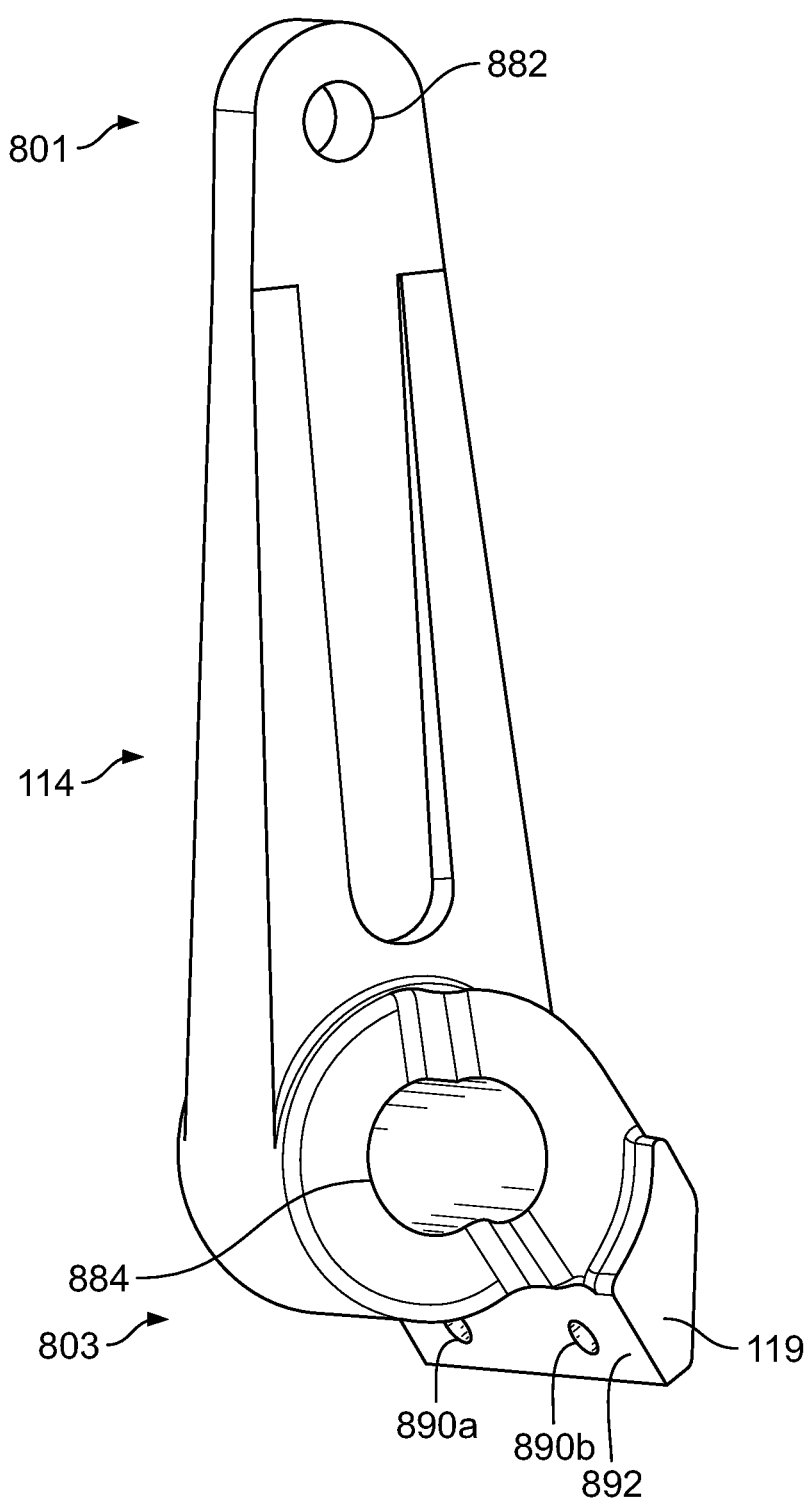
FIG. 8 is a perspective view of a punch arm, in accordance with embodiments of the present invention.

FIG. 8 is a perspective view of the punch arm 114.

Punch arm 114 has a pivot opening 882 at a top or proximal end portion 801 thereof. A suitable pin, bolt, or other member can be installed through the pivot opening 882 so as to join the pivot opening 882 with corresponding pivot openings in the coupler link 174 to form a rotatable coupling at the third joint point 430. Another pivot opening 884 is formed at a bottom or distal end portion 803 of the punch arm 114. Pivot opening 884 will allow a pin, bolt, or other member to be inserted through corresponding pivot openings in sidewall portions 402a-402b of the frame 112 to form a rotatable coupling at the fourth joint point 124.

A downwardly extending jaw 119 extends from one side of the distal end portion 803 of the punch arm 114. Suitable support openings 890a-890b are formed in this jaw 119 so as to allow for the removable affixing of the punch 118 thereon by passing bolts, screws, or other fasteners through the openings 890a-890b in the punch arm 114 and the corresponding openings 790a-790b in the punch 118 (as shown in FIG. 7). A surface 892 is formed on the jaw 119 so as to face the downwardly extending portion associated with the frame 112 and to provide a widened surface for supporting the punch 118 thereon. The punch 118 may be removably attached to the jaw 119 to facilitate replacement of the punch 118 as the male punch projections 700a-700d wear down or are damaged during use.

As can be seen in FIGS. 6-7, the die 116 has a pair of openings 690a-690b, which could be, e.g., threaded bolt holes, extending through the back surface of the die 116, and the punch 118 has a pair of openings 790a-790b, which could be, e.g., threaded bolt holes, extending through the back surface of the punch 118. The openings 690a-690b allow the die 116 to be secured to corresponding bolt openings in the frame 112. The openings 790a-790b allow the punch 118 to be secured to the corresponding bolt openings 890a-890b on the jaw 119 of the punch arm 114.

A plurality of male punch projections 700a-700d extend outwardly from the front surface of the punch 118. In the embodiment shown, the male punch projections 700a-700d have a generally triangular, pointed configuration extending outward from the front surface of the punch 118 so as to provide for a suitable puncturing and punching of the adjoining deck sections. The triangular shape of the punch projections 700a-700d are suitable for mating with the inverted V-shaped female die notches 600a-600d of the fixed die 116. Each of the male punch projections 700a-700d is spaced from each other in generally linear alignment along the surface of the punch 118. When the punch arm 114 is suitably pivoted about the fourth joint point 124, the punch 118 will move toward the fixed die 116 and puncture the adjoining sections of steel decking therebetween.

Figure 9:
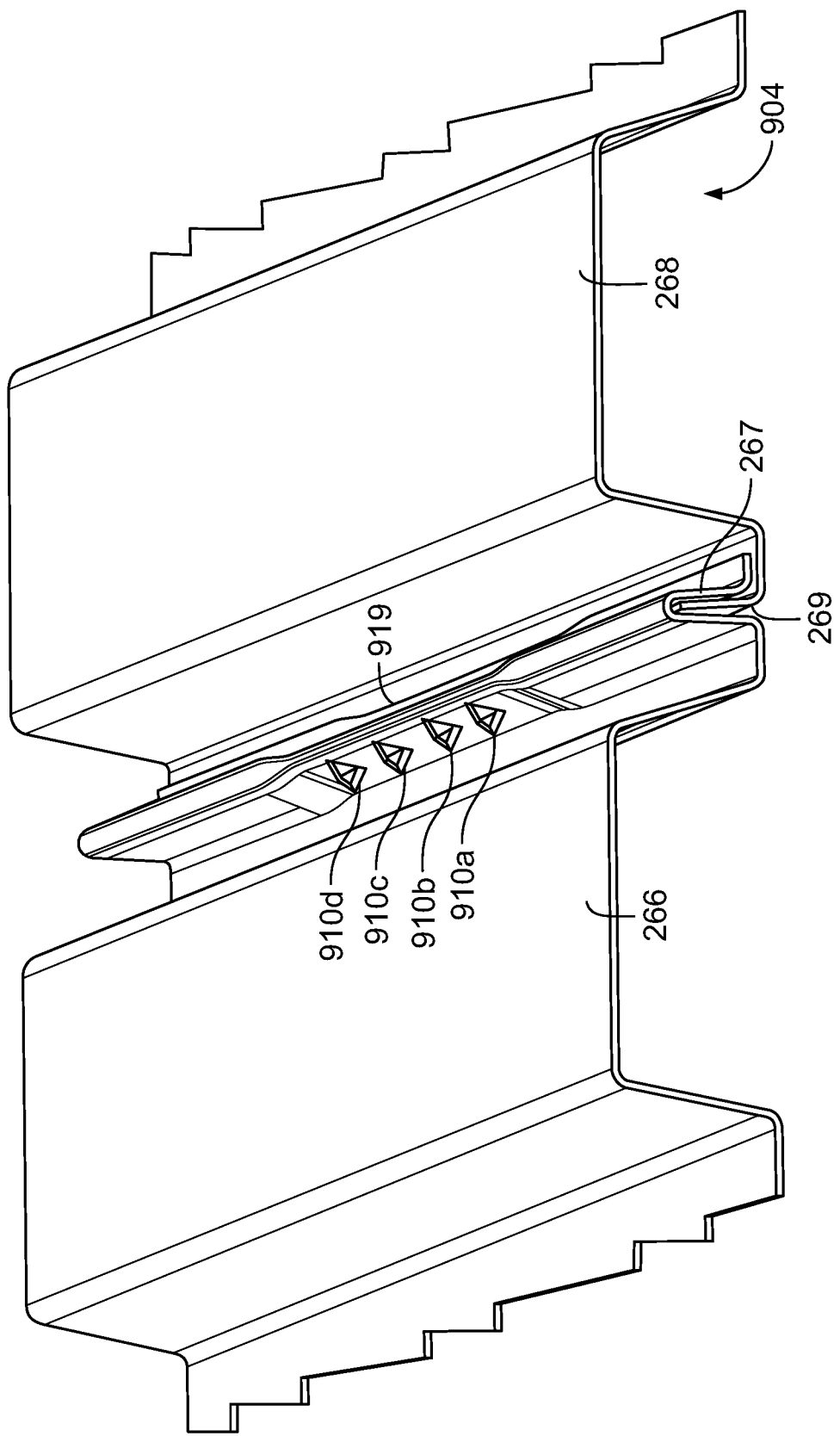
FIG. 9 is a perspective view of the cut in the adjoining sections of steel decking formed by the pneumatic tool, in accordance with embodiments of the present invention.

FIG. 9 is an illustration of a punch made in adjoining sections 266 and 268 of steel decking 904. The relationship between the punch 118 and the fixed die 116 will result in punches 910a-910d being formed in the decking 904. In particular, the steel deck section 268 has an upwardly extending lip portion 269. Deck section 266 has a corresponding inverted U-shaped envelope portion 267. The upward turned lip portion 269 will be received within the interior of the envelope portion 267 so that the deck sections 266 and 268 are loosely connected together. With a single actuation of the pneumatic tool 110, an attachment region 919 including four punches 910a-910d can be formed. The punches 910a-910d will assure a strong and fixed connection between the deck sections 266 and 268. The formation of these triangular-shaped cuts associated with punches 910a-910d helps to prevent any lateral shifting of the sections 266 and 268 with respect to each other. Also, the punches 910a-910d can establish a suitable connection to prevent the sections 266 and 268 from pulling away from each other.

In the illustrated embodiment, four punch projections 700a-700d are used to simultaneously form four punches 910a-910d in the decking 904 with a single actuation of the pneumatic tool 110. The formation of four punches 910a-910d may advantageously provide a higher strength bond than crimping using three or fewer punches, and may also provide higher diaphragm shear capacity.

The triangular-shaped punches 910a-910d can provide a wide-area punch in which the points of the triangular-shaped punches 910a-910d penetrate the metal at a concentrated point to begin the cut, and then utilize the sides of the triangular-shaped punches 910a-910d to generate shearing action to complete the cut. In the described embodiment, the dulling of blades does not present a significant problem to the formation of the suitable punches because the initial punching penetration of the point of the punches 910a-910d does not rely on 100% shearing action. In accordance with some embodiments, these punches 910a-910d may be made with the pneumatic tool 110 without the need for high-precision tolerances between the male punch projections and female dies. If either the male punch projections or the female dies should become dulled with use, the punches 910a-910d can still be formed provided that suitable pressure is applied to the punch arm 114 by the actuator assembly 120 and linkage assembly 170. Because only the punch 118 moves while the die 116 remains fixed in place relative to the frame 112, a precise punching relationship between the arms can be more easily maintained. Since the wearing of the pivotal connections will only occur with respect to a single arm, maintenance can be less than that associated with a pair of pivotable arms.

While the invention has been described in terms of particular embodiments and illustrative figures, those of ordinary skill in the art will recognize that the invention is not limited to the embodiments or figures described. For example, in various embodiments described above, the pneumatic tool is used to form punches in sections of steel decking. Other embodiments of the pneumatic tool may be used for any desired punching or crimping purposes.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, details of the invention may not be described in the specification or depicted in the drawings in more detail than is necessary to provide a fundamental understanding of the invention and make apparent to those of ordinary skill in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A pneumatic tool, comprising:
a frame comprising a first joint point and a fourth joint point;
a die rigidly coupled to the frame wherein a longitudinal axis of the pneumatic tool extends along the frame and is aligned with the die, the die comprising a plurality of female die cavities;
a coupler link having a first end connected at a second joint point and a second end connected at a third joint point, wherein the second and third joint points are movable relative to the frame;
a rocker link having a first end portion rotatably coupled to the first joint point of the frame and a second end portion rotatably coupled to the coupler link at the second joint point, wherein the rocker link has a length greater than a length of the coupler link;
a punch arm having a proximal end portion rotatably coupled to the coupler link at the third joint point and a distal end portion rotatably coupled to the fourth joint point of the frame;
a punch coupled to the distal end portion of the punch arm, the punch comprising a plurality of male punch projections, each of the male punch projections being configured to mate with a corresponding one of the plurality of female die cavities;
an actuator assembly, comprising:
a housing coupled to the frame, and
a push rod having a proximal end positioned in the housing and a distal end extending out of the housing, wherein the distal end of the push rod is rotatably coupled to the coupler link and the rocker link at the second joint point, wherein the push rod defines a push rod axis that intersects the longitudinal axis at an oblique angle; and
a trigger coupled to the actuator assembly, wherein actuation of the trigger causes the actuator assembly to drive the push rod along the push rod axis from a retracted position to an extended position, thereby moving the second joint point from one side of the longitudinal axis to an opposite side;
wherein the punch arm is rotatable between: (a) a first state when the push rod is in the retracted position in which the punch is spaced from the die, and (b) a second state when the push rod is in the extended position in which the punch engages the die.

2. The pneumatic tool according to claim 1, wherein when the punch arm is in the first state, the coupler link is parallel with the push rod.

3. The pneumatic tool according to claim 1, wherein: the punch comprises four male punch projections.

4. The pneumatic tool according to claim 1, wherein:
the actuator assembly comprises a diaphragm contained within the housing, wherein a proximal end of the push rod is coupled to the diaphragm and the distal end of the push rod extending from the housing of the actuator assembly.

5. The pneumatic tool according to claim 1, wherein the actuator assembly further comprises:
a diaphragm positioned in the housing and coupled to the proximal end portion of the push rod, wherein an interior of the housing and the diaphragm define a pressure chamber in the interior of the housing; and
a spring applying a force against the diaphragm to compress the pressure chamber.

6. The pneumatic tool according to claim 5, further comprising:
an inlet port coupled to the trigger; and
an air supply line pneumatically coupled to the inlet port; wherein:
the actuator assembly further comprises a first port pneumatically coupling the pressure chamber to the air supply line; and
the trigger controls an airflow from the inlet port to the pressure chamber.

7. The pneumatic tool according to claim 6, wherein:
the actuator assembly further comprises a second port pneumatically coupling the pressure chamber to the air supply line.

8. The pneumatic tool according to claim 6, wherein:
activation of the trigger releases pressurized gas from the inlet port through the first port and into the pressure chamber; and
release of the trigger stops flow of gas from the pressurized gas source coupled to the inlet port through the first port.

9. The pneumatic tool according to claim 6, further comprising:
an exhaust valve pneumatically coupled to the first port of the actuator assembly, whereby release of the trigger causes the spring to compress the pressure chamber and exhaust gas from the pressure chamber out of the exhaust valve.

10. The pneumatic tool according to claim 5, further comprising:
an inlet port coupled to the trigger;
an air supply line pneumatically coupled to the inlet port; wherein:
the actuator assembly further comprises a first port and a second port pneumatically coupling the pressure chamber to the air supply line, wherein
the trigger controls an airflow from the inlet port to the pressure chamber, wherein activation of the trigger releases pressurized gas from the inlet port through the first port and the second port and into the pressure chamber, and
release of the trigger stops flow of gas from the pressurized gas source coupled to the inlet port through the first port and the second port; and
an exhaust valve pneumatically coupled to the first port and the second port, whereby release of the trigger causes the spring to compress the pressure chamber and exhaust gas from the pressure chamber out of the exhaust valve.

11. The pneumatic tool according to claim 1, wherein:
the die comprises a die plate comprising a first bolt opening and a plurality of notches along a first edge, wherein each notch of the plurality of notches defines a corresponding one of the plurality of female die cavities; and
the pneumatic tool further comprises a first bolt passing through the first bolt opening to couple the die plate to the frame.

12. The pneumatic tool according to claim 1, wherein:
the punch comprises a punch plate comprising a second bolt opening, wherein each of the male punch projections comprises a triangular die extending from the punch plate; and
the pneumatic tool further comprises a second bolt passing through the second bolt opening to couple the punch plate to the punch arm.

13. The pneumatic tool according to claim 1, wherein: a length of the punch arm is greater than a length of the rocker link.

14. A method of crimping metal panels, comprising:
supplying pressurized gas to an inlet port of a pneumatic tool, the pneumatic tool comprising:
- a frame comprising a first joint point and a fourth joint point;
- a die rigidly coupled to a distal end of the frame, wherein a longitudinal axis of the pneumatic tool extends along the frame and is aligned with the die;
- a coupler link having a first end connected at a second joint point and a second end connected at a third joint point, wherein the second and third joint points are movable relative to the frame;
- a rocker link having a first end portion rotatably coupled to the first joint point of the frame and a second end portion rotatably coupled to the coupler link at the second joint point;
- an actuator assembly comprising a housing and a push rod extending from the housing, wherein a distal end of the push rod is rotatably coupled to the coupler link and rotatably coupled to the second end portion of the rocker link at the second joint point, wherein the push rod defines a push rod axis that intersects the longitudinal axis at an oblique angle; and
- a punch arm having a proximal end portion rotatably coupled to the coupler link at the third joint point and a distal end portion rotatably coupled to the fourth joint point of the frame;

the method comprising:
positioning a first panel and a second panel between the die and a punch coupled to the distal end portion of the punch arm; and
releasing pressurized gas from the inlet port of the pneumatic tool into a pressure chamber of the actuator assembly, thereby causing an internal diaphragm of the actuator assembly to linearly translate the push rod rotatably coupled to the coupler link and rotatably coupled to the second end portion of the rocker link;
wherein the linear translation of the push rod applies a force to the coupler link to thereby cause the punch arm to rotate, thereby moving the second joint point from one side of the longitudinal axis to an opposite side and driving a plurality of male punch projections of the punch through the first panel and the second panel, and into a corresponding one of a plurality of female die cavities in the die.

15. The method according to claim 14, further comprising:
stopping flow of pressurized gas into the pressure chamber of the actuator assembly; and
utilizing a spring to apply a force on the internal diaphragm to thereby compress the pressure chamber and retract the push rod.

16. The method according to claim 15, wherein:
the retracting of the push rod causes the punch arm to rotate so as to withdraw the plurality of male punch projections from the plurality of female die cavities, the first panel, and the second panel.

17. The method according to claim 14, further comprising:
uncoupling the punch from the distal end portion of the punch arm; and
coupling a replacement punch to the distal end portion of the punch arm.

18. The method according to claim 14, wherein: the punch comprises four male punch projections; and
the driving of the plurality of male punch projections through the first panel and the second panel forms four cuts in the first panel and the second panel, thereby rigidly coupling the first panel to the second panel.

* * * * *